US006322308B1

(12) United States Patent
Grant

(10) Patent No.: US 6,322,308 B1
(45) Date of Patent: Nov. 27, 2001

(54) STERN DRIVE AND OUTBOARD LOCKS

(76) Inventor: Christopher J. Grant, 2120 Lawson Ave., Port Charlotte, FL (US) 33952

( * ) Notice: Subject to any disclaimer, the term of this patent is extended or adjusted under 35 U.S.C. 154(b) by 0 days.

(21) Appl. No.: 09/626,220

(22) Filed: Jul. 26, 2000

Related U.S. Application Data

(62) Division of application No. 09/496,419, filed on Feb. 2, 2000, now Pat. No. 6,176,661.

(60) Provisional application No. 60/155,576, filed on Sep. 24, 1999.

(51) Int. Cl.[7] .............................. F16B 19/00; F16B 37/14

(52) U.S. Cl. ........................ 411/429; 411/372.6; 411/373; 411/910; 70/232

(58) Field of Search ................................ 70/34, 229–232, 70/417; 411/372.6, 373, 429, 396, 910

(56) References Cited

U.S. PATENT DOCUMENTS

| | | | | |
|---|---|---|---|---|
| 1,530,521 | * | 3/1925 | Robinson | 70/232 |
| 1,796,517 | * | 3/1931 | Ganz | 70/232 |
| 1,818,373 | * | 8/1931 | Beach | 70/232 X |
| 1,828,658 | * | 10/1931 | Henke, Jr. | 70/232 X |
| 1,877,545 | * | 9/1932 | Wise | 70/232 |
| 4,904,145 | * | 2/1990 | Koutsoupidis | 411/396 |
| 5,630,687 | * | 5/1997 | Robinson | 411/910 X |
| 6,161,402 | * | 12/2000 | Moore | 70/232 X |

* cited by examiner

*Primary Examiner*—Neill Wilson
(74) *Attorney, Agent, or Firm*—Frank A. Lukasik

(57) ABSTRACT

A locking device for securing outboard motors and stern drives mounted on a plurality of exposed studs on the stern of a boat, and construction equipment on a plurality of exposed studs inset in concrete or other media. The invention consists of a stainless steel lock nut, a lock body, and a lock assembly having a lock catch.

1 Claim, 21 Drawing Sheets

STERN DRIVE AND OUTBOARD LOCKS

RELATED APPLICATION

This application claims benefit of Provisional Application Ser. No. 60/155,576 Filed Sep. 24, 1999 which is a Divisional of patent application Ser. No. 09/496,419 Filed Feb. 2, 2000 now U.S. Pat. No. 6,176,661.

BACKGROUND OF THE INVENTION:

1. Field of the Invention

This invention relates generally to locking devices and more particularly to a locking system for securing outboard motors, stern drives, construction equipment, building equipment, trucking equipment, or commercial and residential premises against theft or intrusion.

2. Description of the Prior Art

The marine industry is experiencing an escalation in the number of thefts of stern drives and outboard motors from boats stored in marinas or private docks or wherever a thief may have occasion to work undetected for a brief period. As motors and stern drives become more sophisticated and thus more expensive, the market for stolen units is increasing. It takes only minutes for a thief using battery powered tools, to release a motor or stern drive and remove it Besides the inconvenience of replacing the stolen motor, filing an insurance claim is time consuming and increases the cost of premiums.

Locking means for out board motors and stern drives that are commonly available, are only a minor deterrent to theft. Thieves can defeat such systems in a variety of ways, mostly by either gripping said lock with special tools to unthread the lock or by simply cutting a face into its surface making it accessible to normal wrenches. Most locking devices now available, rely upon a special keys or tools for installation and removal, and while such tools are meant only for legitimate access, thieves can simply obtain sets of said tools or keys for their own use. Construction equipment is often secured by simply hoisting it in the air beyond the reach of thieves, this is possible only with an available crane. Truckers secure rear roll doors with a variety of standard padlocks. Such locks are subject to removal by cutting with bolt cutters as are security gates or any other protective system which utilizes them.

Thus, an object of the instant invention is to provide the boat owner, homeowner, trucker, construction company for example with a means of securing an out board motor, stern drive, propeller, trucking container or perimeter gate for example, using a unique combination of simple components which, when used together provide a secure and tamper-proof attachment means.

SUMMARY OF THE INVENTION

The essence of the instant invention is the use of very tough (304 stainless) components which attach to the normal mounting bolts of a stern drive, outboard, or other equipment as described herein and are locked together to form a secure, difficult to remove, attachment unit. Removal of said attachment unit is only necessary in the case of marine engines when a motor is changed or, in the case of a stern drive, whenever work has to be done on the drive shaft or upper gear system, all other service can be accomplished with either unit in situ. The instant invention in each of its embodiments can be installed using simply a socket or wrench and a small hammer to tap locking pins in place (when required). Any moderately skilled individual can easily install the lock. The instant invention, in its "keyless" embodiment, once assembled on the mounting studs of the stern drive or outboard motor, can only be removed by destroying the lock with the appropriate shop tools, such as, for example, a diamond edged saw. By reason of its construction from 304 work-hardened stainless, and the fact that over 1.25 inches of the steel must be cut to effect its removal and that the removal must be done in a special sequence of cuts, the time thus involved is sufficient to deter a thief from taking the motor or stern drive. The instant invention in its "keyed" embodiments uses the same 304 stainless for its main components but is secured to the stern drive, outboard, construction, residential or trucking equipment by a pin, tumbler or other design of keyed lock.

Description of a First Embodiment

Figure 1:
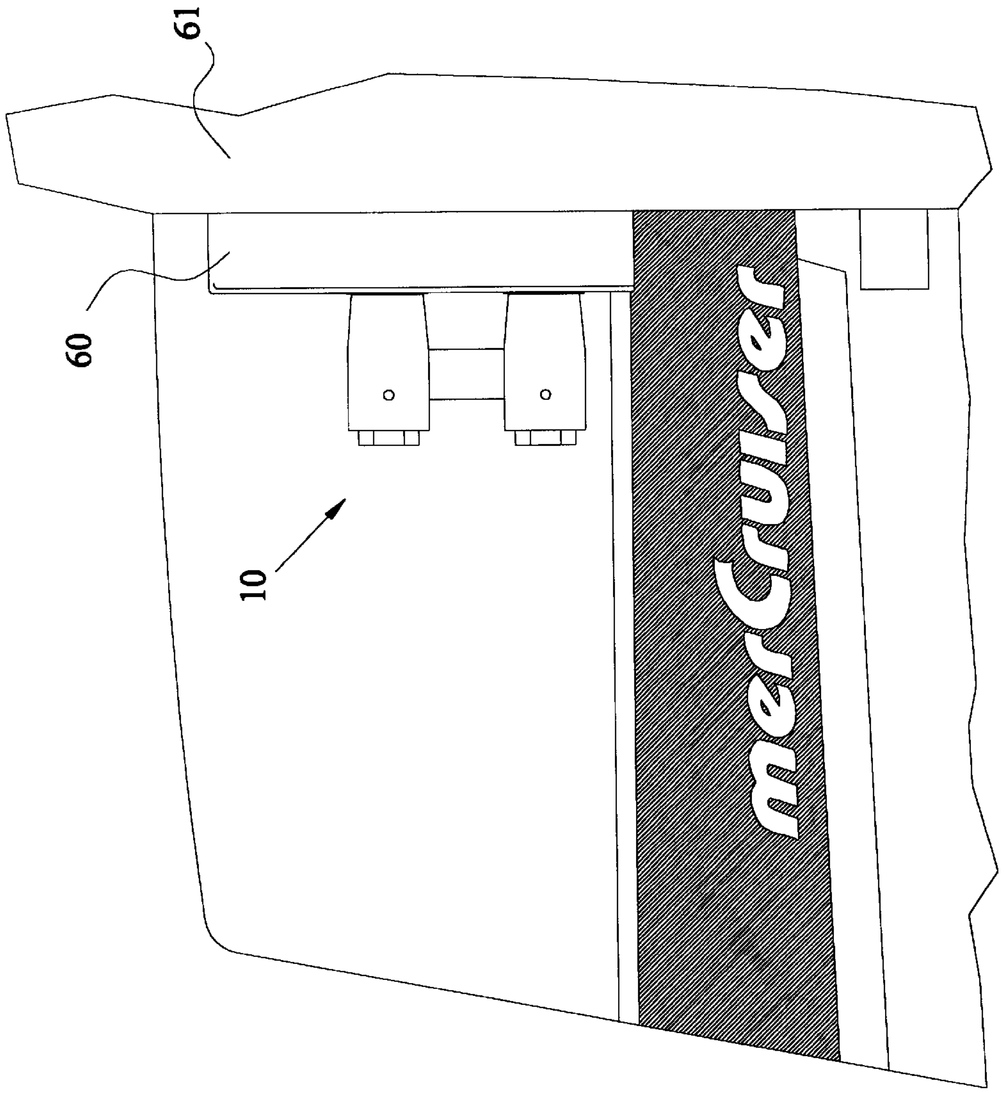
FIG. 1 is a side view of the top section of a typical out drive unit with the invention shown installed in accordance with the invention.

Referring now to the drawings wherein like numerals designate like and corresponding parts throughout the several views, numerals 10 (FIGS. 1, 12), 145(FIG. 16) and 245(FIG. 21) generally designate the locking device assemblies of the invention. In FIG. 1 the overall locking device assembly is fitted to out drive 60 and motor body 61.

Figure 2:
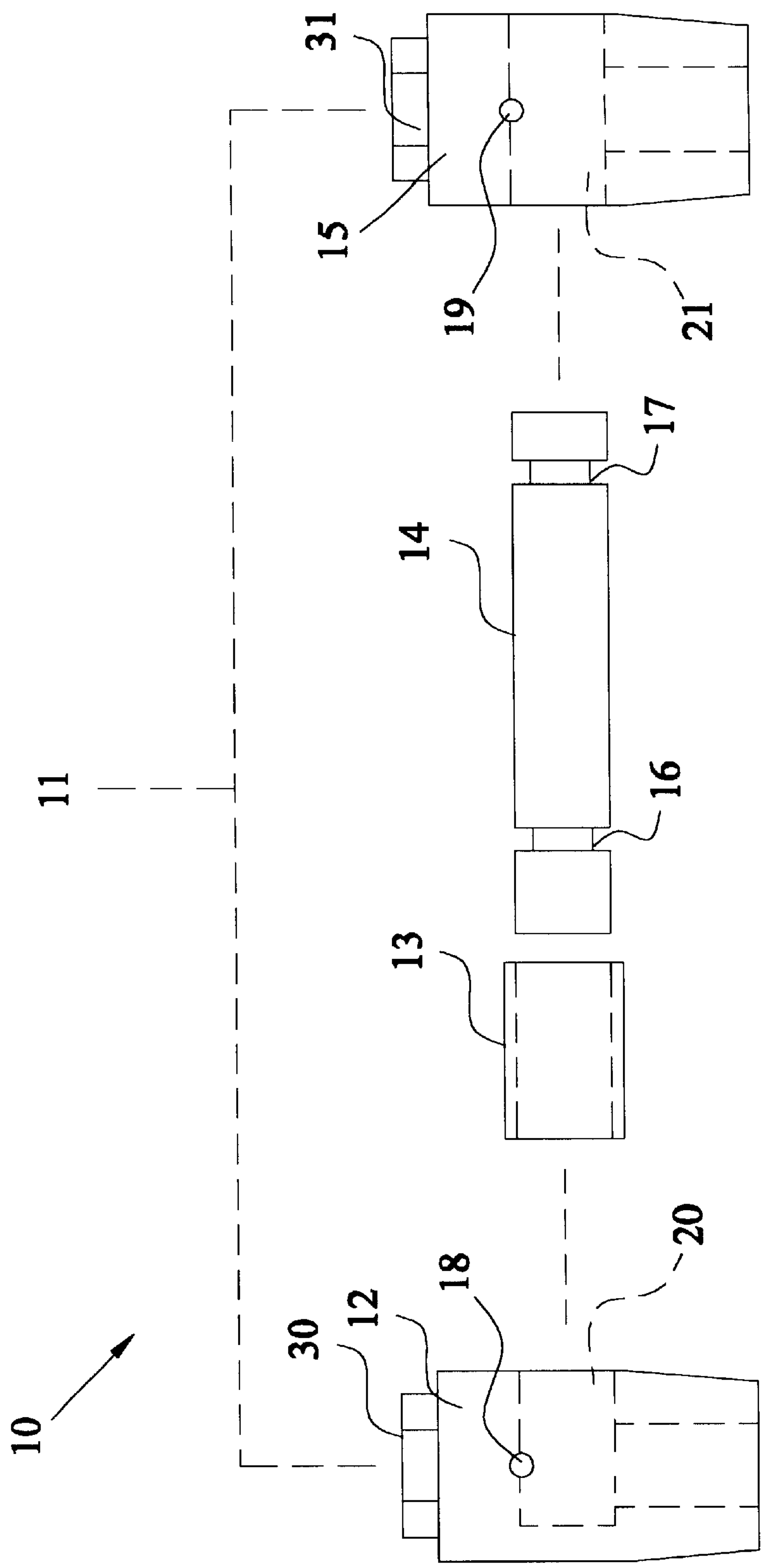
FIG. 2 is an exploded side view of the locking device showing the component parts in accordance with the invention.
Figure 3:
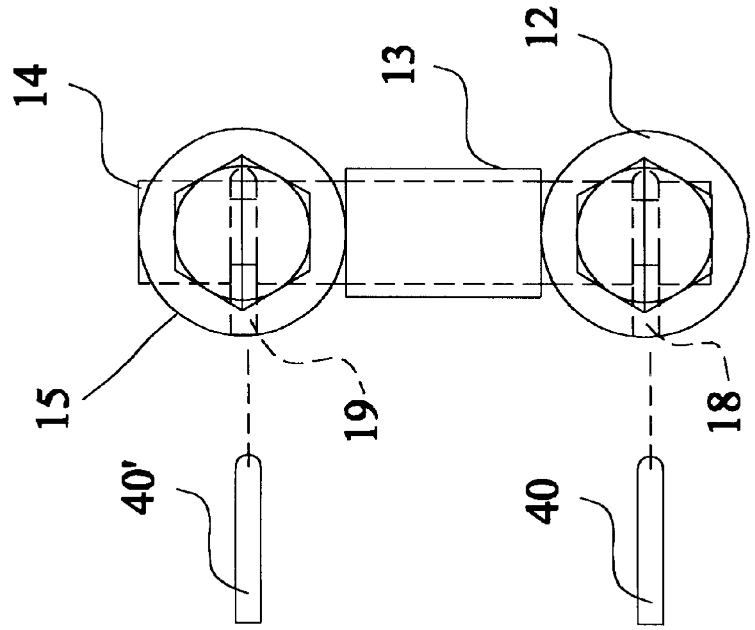
FIG. 3 is a top view of the assembled device showing the locking pins.

In FIG. 2, the component parts of the locking assembly are shown in an exploded view with the entire assembly designated by numeral 11. The lock 10 consists of two, one inch diameter, 304 work-hardened stainless steel lock nuts 12 and 15with through hole 21 (lock 15) drilled at 90° to a center line drawn through the lock nut 15, and blind hole 20 (lock 12) drilled at 90° to a center line drawn through the lock nut 12, ¾ Hex heads 30 and 31, a ½ inch diameter, 304 work-hardened stainless steel pin 14, a ⅝ inch diameter 304 work-hardened stainless steel sleeve 13 and two tempered steel roll pins 40 and 40' (FIG. 3). FIG. 2 shows detailed drawings of pin 14 having two ⅛ inch wide grooves 16 and 17 formed near each end. Sleeve 13 has an outside diameter of ⅝ inches and an inside diameter of ½ inch. FIG. 3 is a top view partially in section of the assembled lock 10 showing steel pins 40 and 40' prior to their installation through blind hole 18 drilled in lock 12, at 90° to the center line and intersecting blind hole 20 with one half of the hole 18 passing through hole 20, and blind hole 19 drilled in lock 15, at 90° to the center line and intersecting through hole 21 drilled in lock 15 (FIG. 2).

Figure 4:
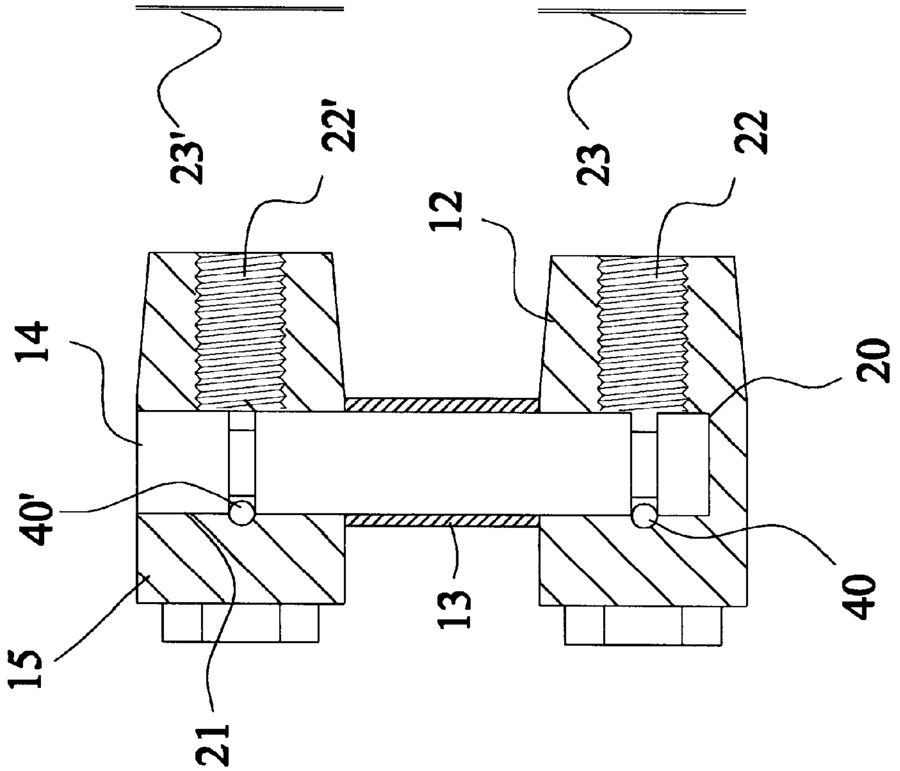
FIG. 4 is a side view partly in section showing the internal features of the device as they appear when assembled.

FIG. 4 is a side view, partially in section, of the assembled lock showing 7⁄16 inch threaded holes 22 and 22' which are screwed into exposed studs 51 and 52. Pin 14 is held in position within holes 20 and 21 and is secured by lock pins 40 and 40' which engage grooves 16 and 17.

Figure 5:
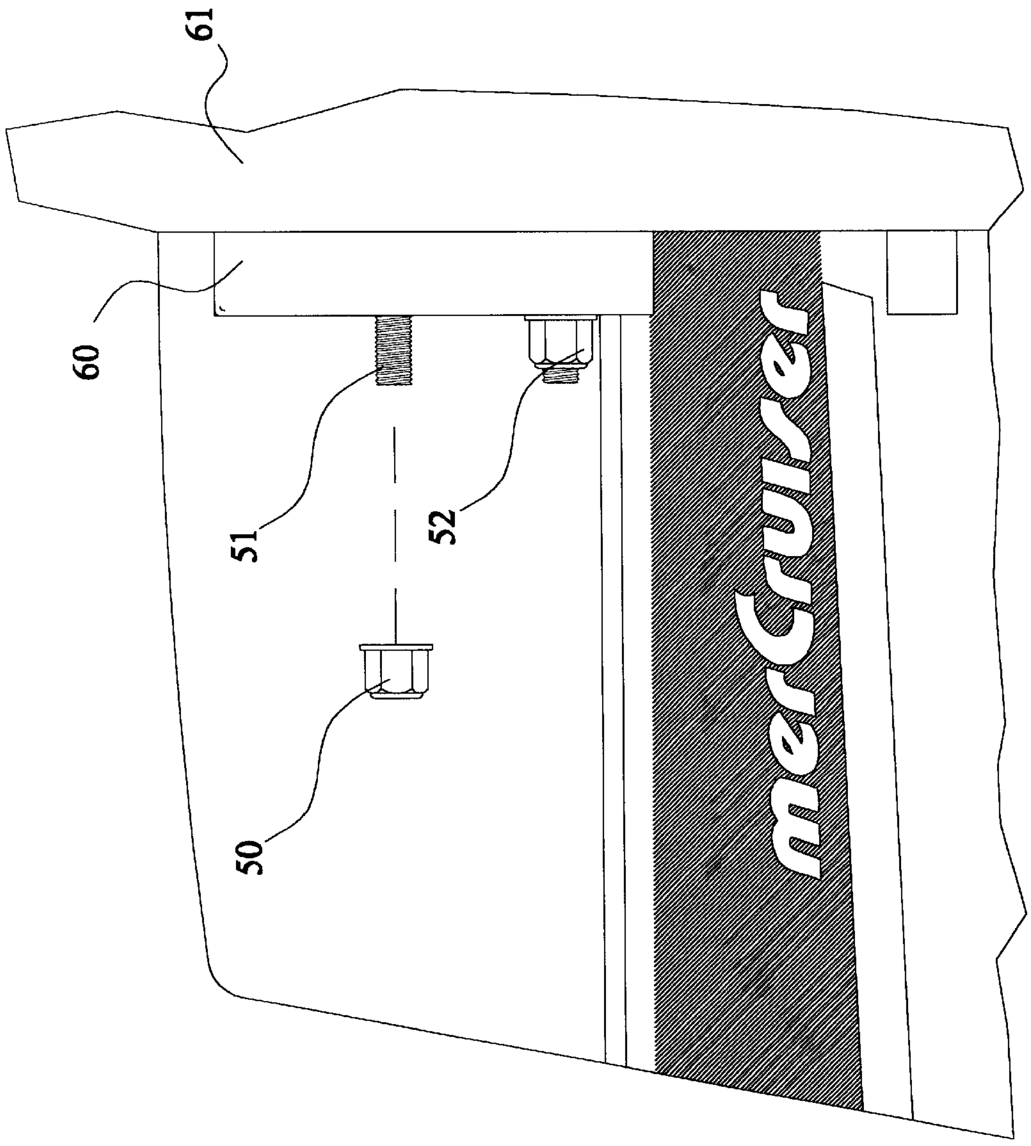
FIGS. 5–10 are a series of side views of a typical out drive showing in sequence, the assembly procedure of the instant invention.

FIG. 5 is the first of the series of illustrations of the assembly sequence of the lock, wherein lock nuts 50 and 52 are removed. Stud 51 is now exposed ready for the mounting of the locking assembly 10.

Figure 6:
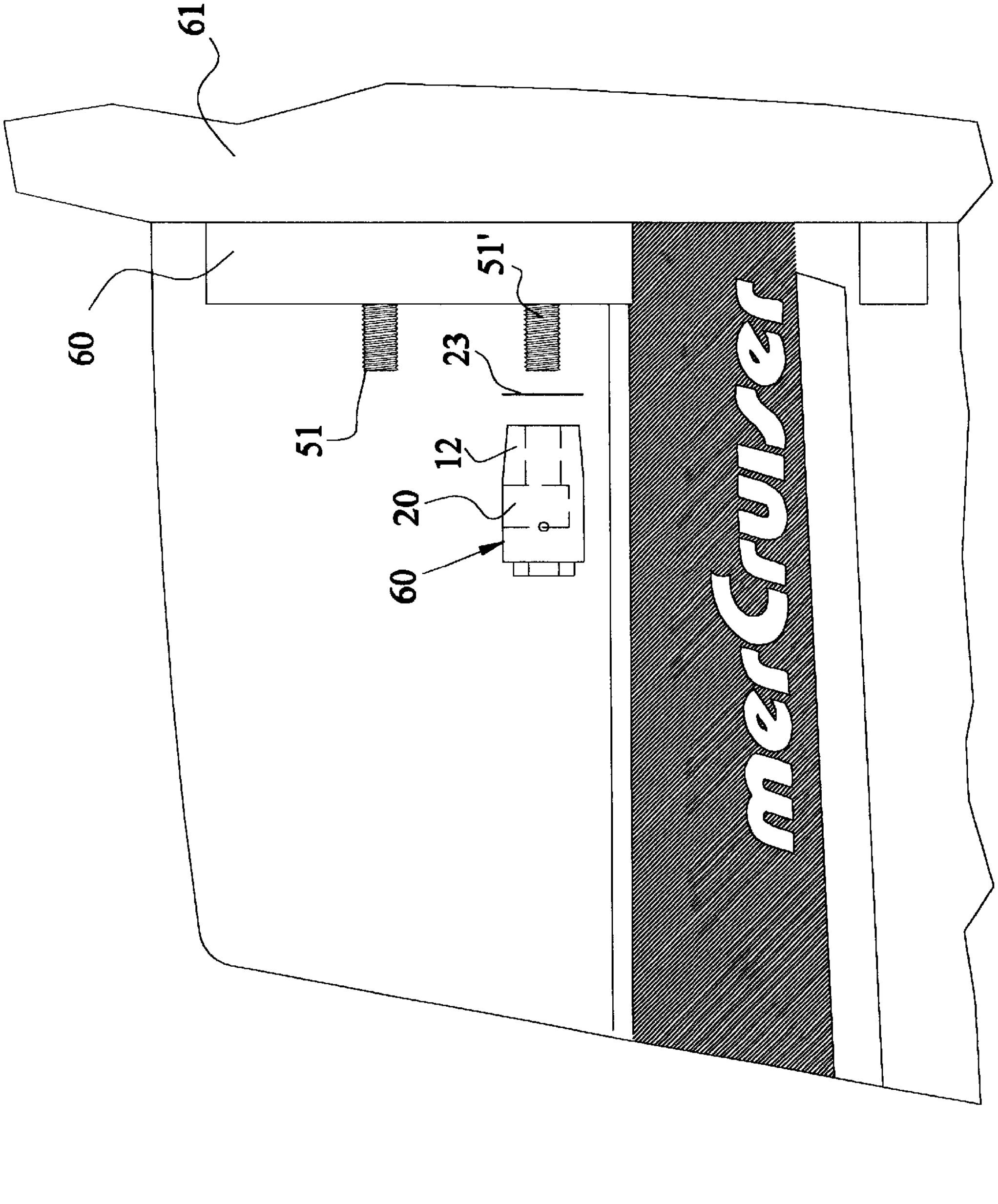
Figure 7:
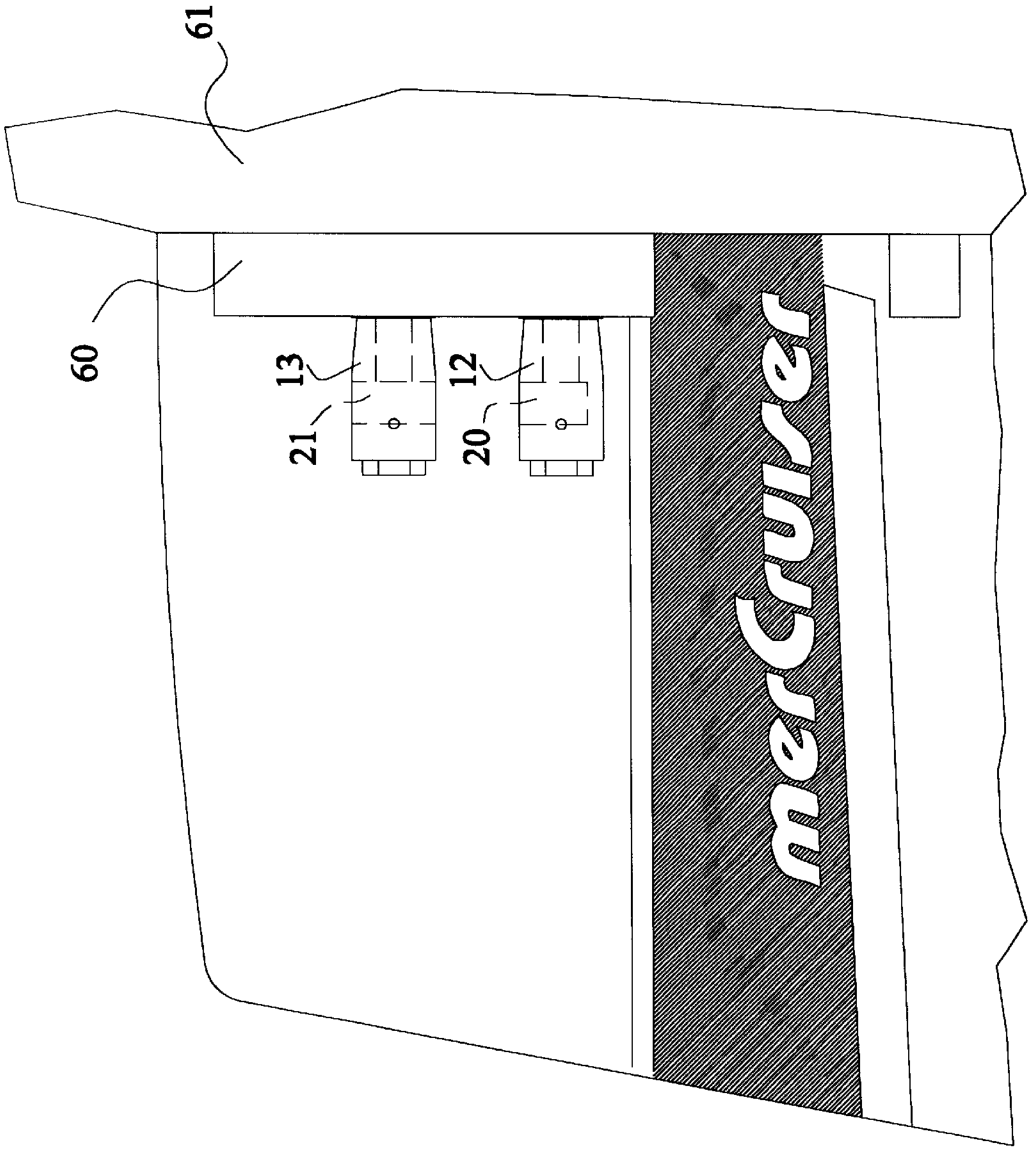

FIG. 6 shows the exposed stud 51 and 51' and nut 60 being offered up for threading onto the stud 51'. Spacer/shim 23 is interposed between the face of nut 12 and the face of out drive 60 the shim 23 allows nut 60 to be tightened while keeping its hole 20 in the correct vertical plane for the later installation of pin 14. Blue dot 60 on the dorsal surface of nut 12 is used as a reference point to show the user which way the nut 12 should be positioned. In FIG. 7 both locks 12 and 15 are in position with their through holes, 20 and 21 respectively, lined up ready to receive sleeve 13.

Figure 8:
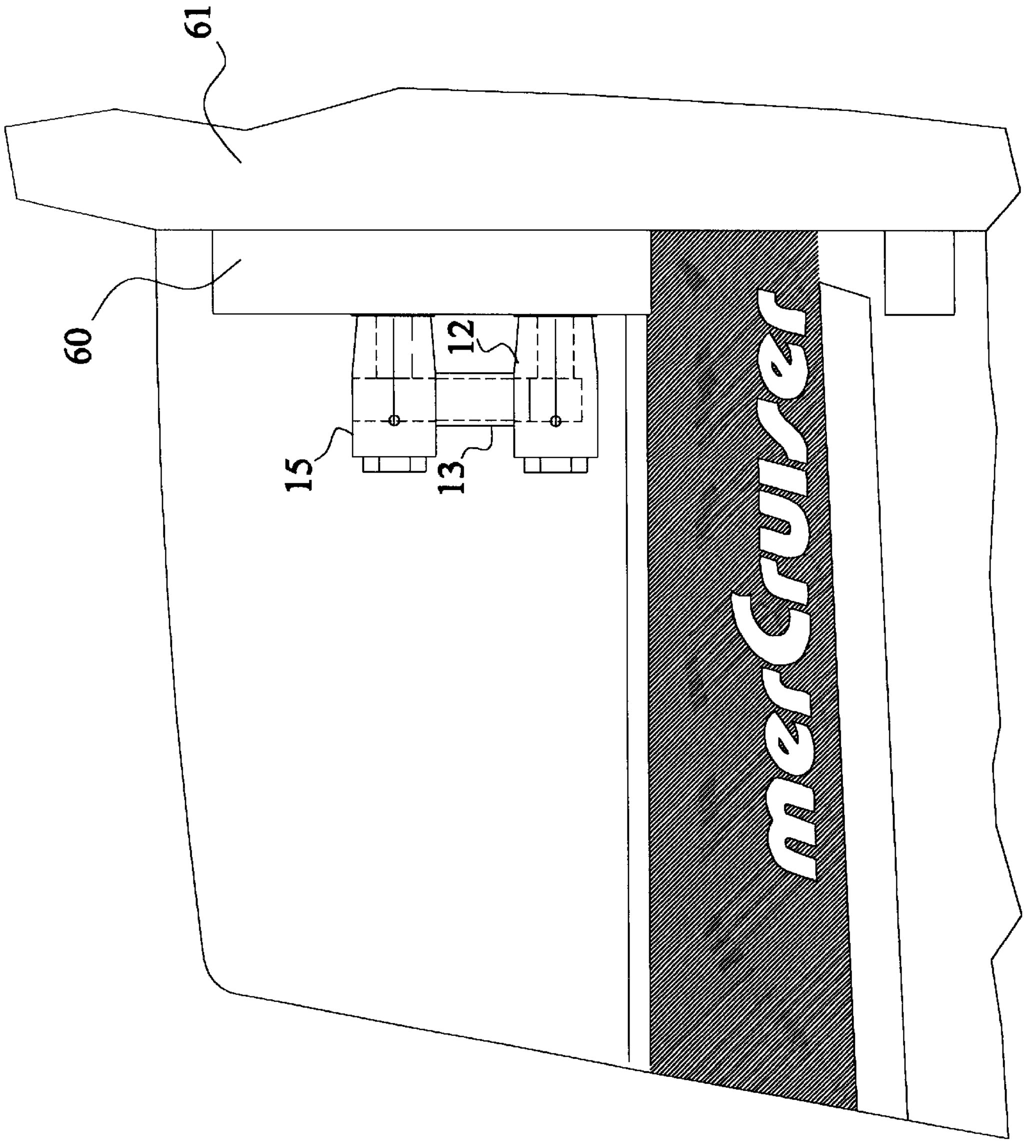

FIG. 8 shows sleeve 13 in position ready for pin 14 positioned for fitment and locking pills 40' and 40 are ready to be inserted as a final step.

Figure 9:
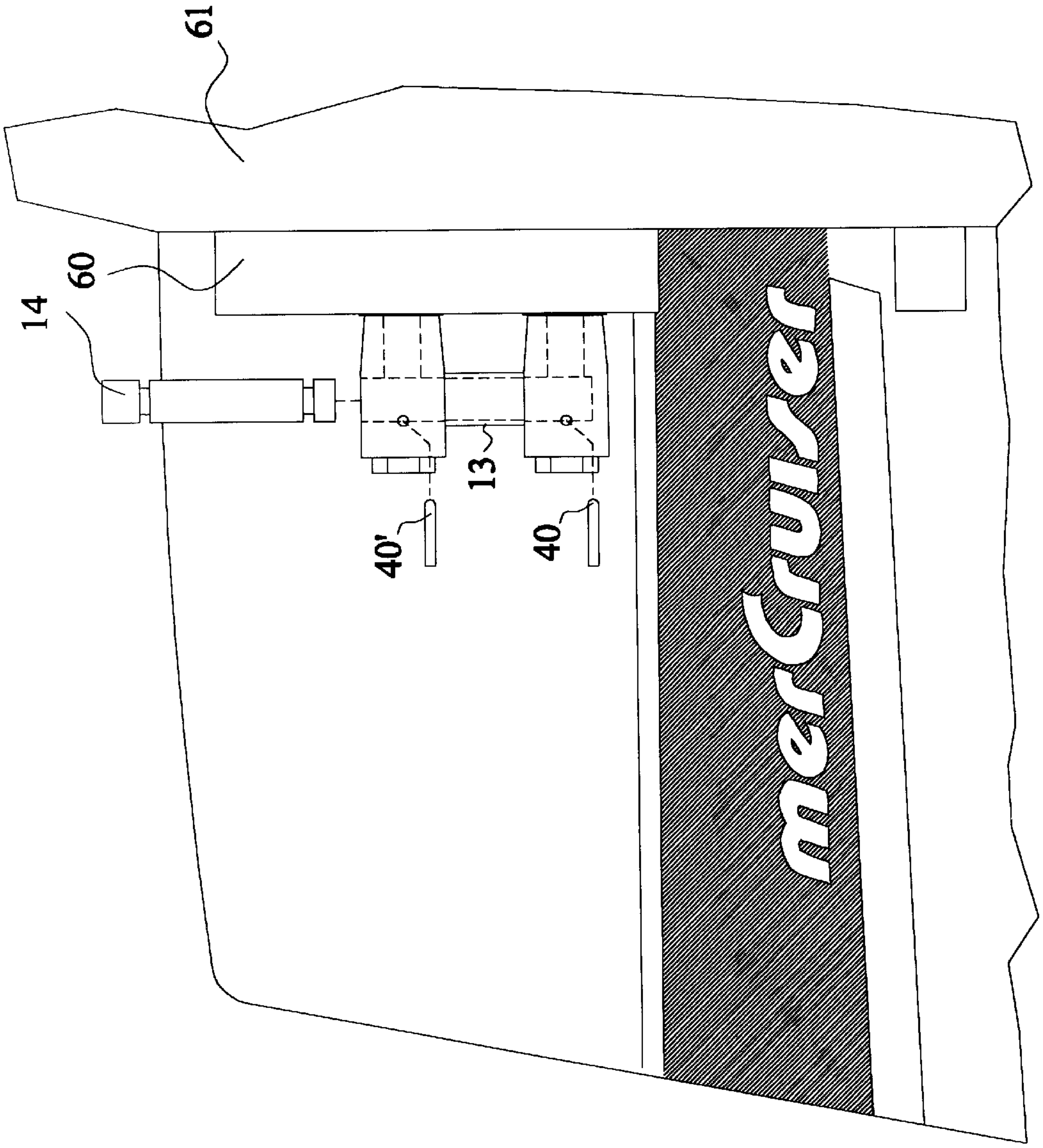

FIG. 9 shows pin 14 positioned for fitment and locking pins 40' and 40 ready to be inserted as a final step.

Figure 10:
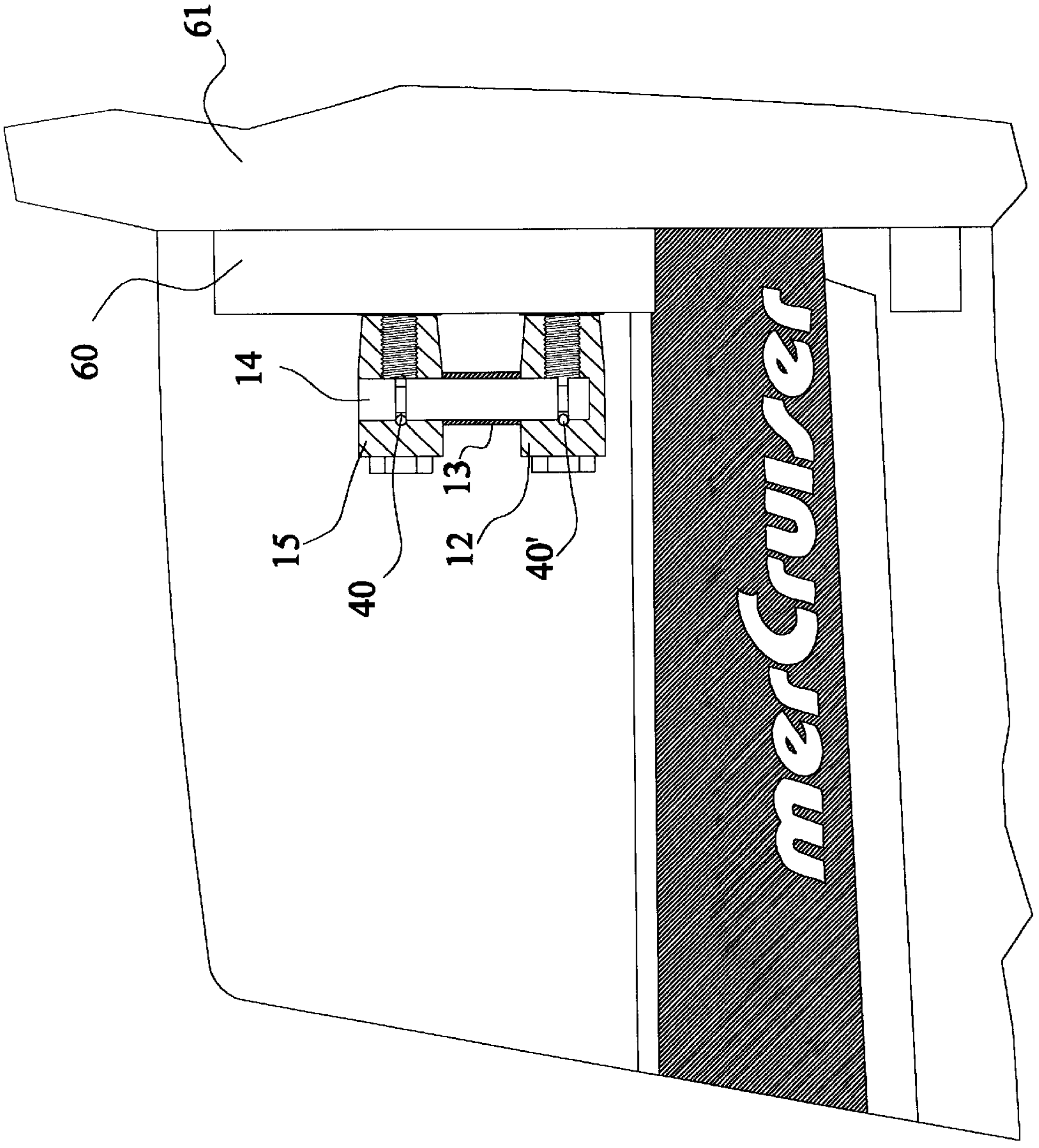

FIG. 10 is a view partially in section showing the lock assembly in position. From this view it is possible to visualize the difficulty that would be encountered in removing said assembly, nuts 12 and 15 cannot be unthreaded because pin 14 prevents their rotation. Locking pins 40 and 40' prevent the removal of pin 14. Sleeve 13 is rotatably attached to pin 14 and any effort to cut it is thwarted by its tendency to spin on pin 14, Similarly, pin 14 cannot be cut or drilled easily because it too can spin away from a cutting device. In actual removal, sleeve 13 is clamped and slit down its length using a 2 inch diameter diamond wheel. A larger wheel cannot get in to reach sleeve 13 because it hits on nuts 12 or 15. The sleeve 13 is then rotated 180 degrees and clamped again and slit lengthwise to remove it from pin 14. Pin 14 is then clamped and cut close to nut 12, clamped again and cut close to nut 15. Nuts 12 and 15 can now be unthreaded.

Description of a Second Embodiment

Figure 11:
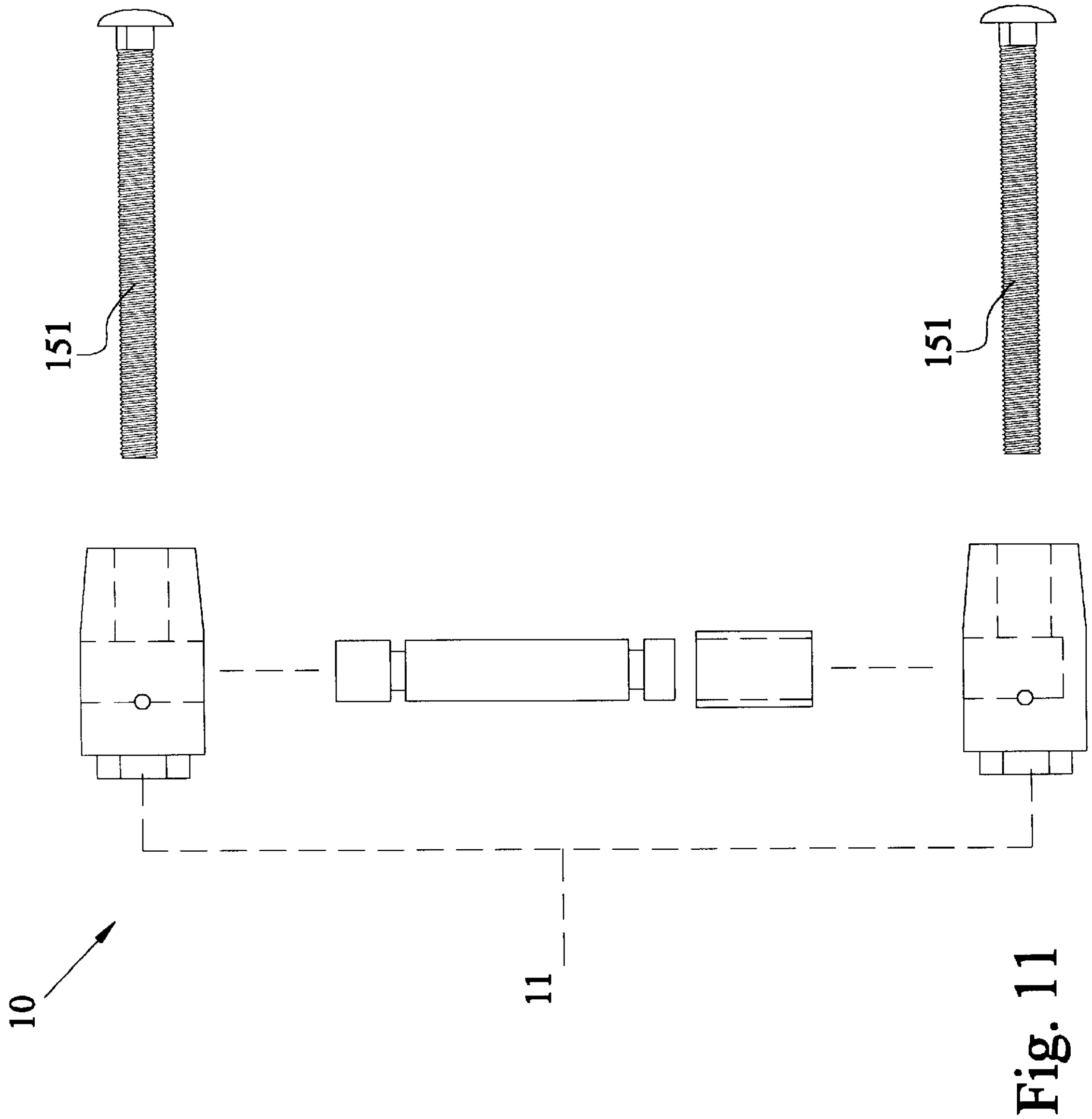
FIG. 11 is an exploded side view of the locking device showing the component parts in accordance with the invention.

In FIG. 11, the component parts of the locking assembly are shown in an exploded view with the entire assembly designated by numeral 11 and 304 stainless coach bolts 151 are in position awaiting installation of locking assembly 11.

Figure 12:
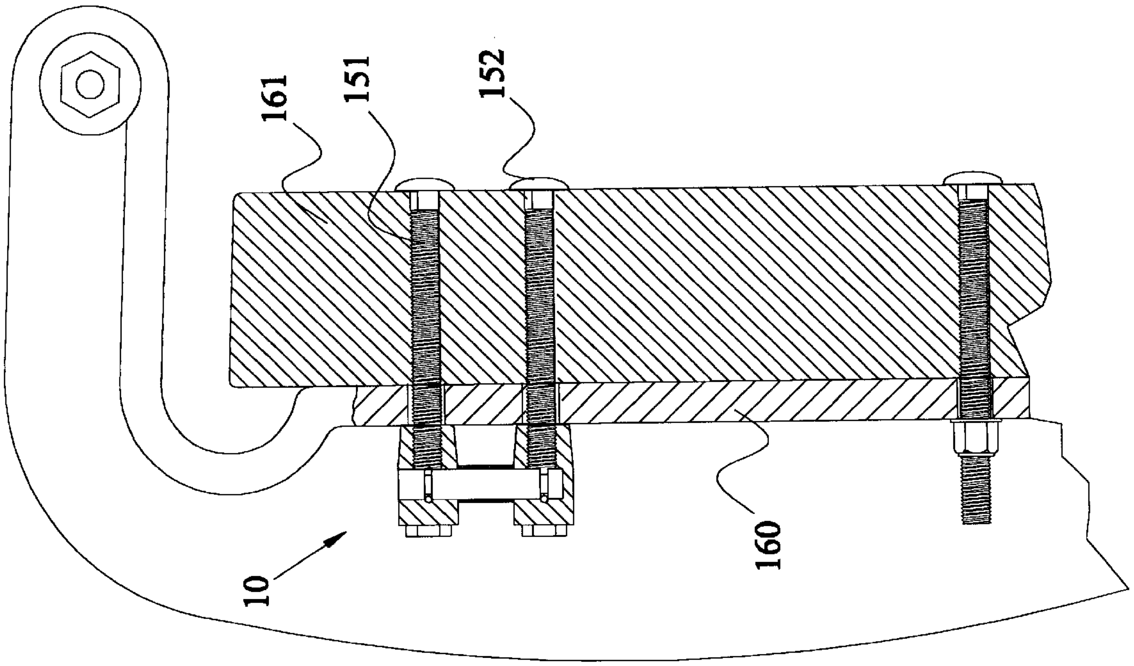
FIG. 12 is side view of the locking device showing the component parts assembled and mounted to a typical outboard motor mount assembly in accordance with the invention.

In FIG. 12, locking assembly 10 is shown clamping together using coach bolts 151, transom 161 and outboard mount 160. Coach bolt head 152 is pulled tightly against transom 161 simultaneously securing outboard mount 160 to transom 161 allowing no removal access to coach bolt 151.

Description of a Third Embodiment

Figure 13:
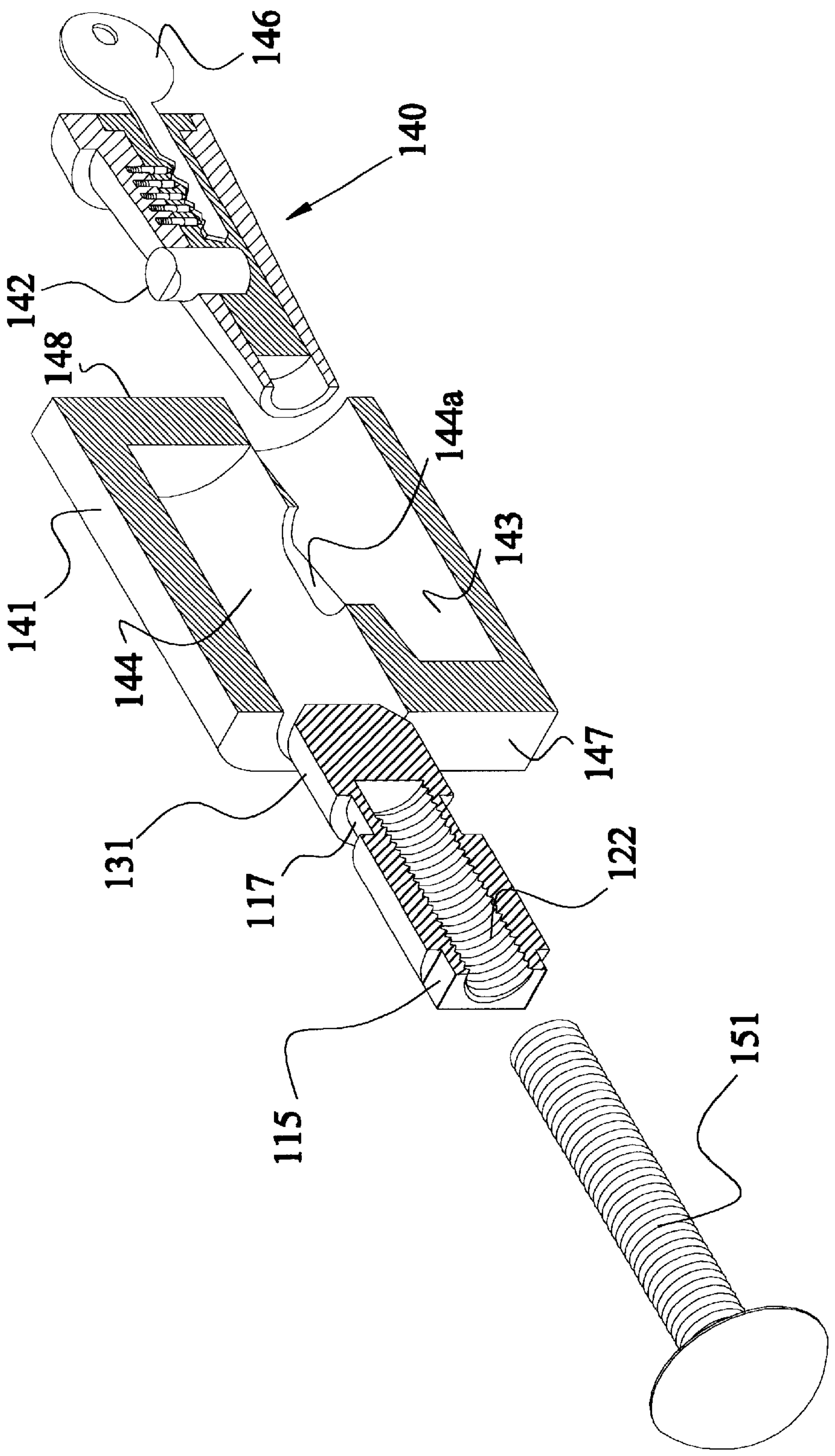
FIG. 13 is an isometric exploded view in section showing a further embodiment of the invention.

FIG. 13. shows lock pin 131 in position ready to enter lock body 141. Coach bolt 151 is in position ready to be screwed into internal thread 122. Face 115 is located at the end of lock pin 131 at the opposite end to groove 117 so as to avoid during assembly, its interference with lock catch 142 on lock assembly 140. Face 115 and its adjacent faces permit the use of a wrench to tighten together lock pin 131 and coach bolt 151. Lock body 141 consists of ends 147, 148, holes 143, 144 and gap 144*a*.

Figure 14A:
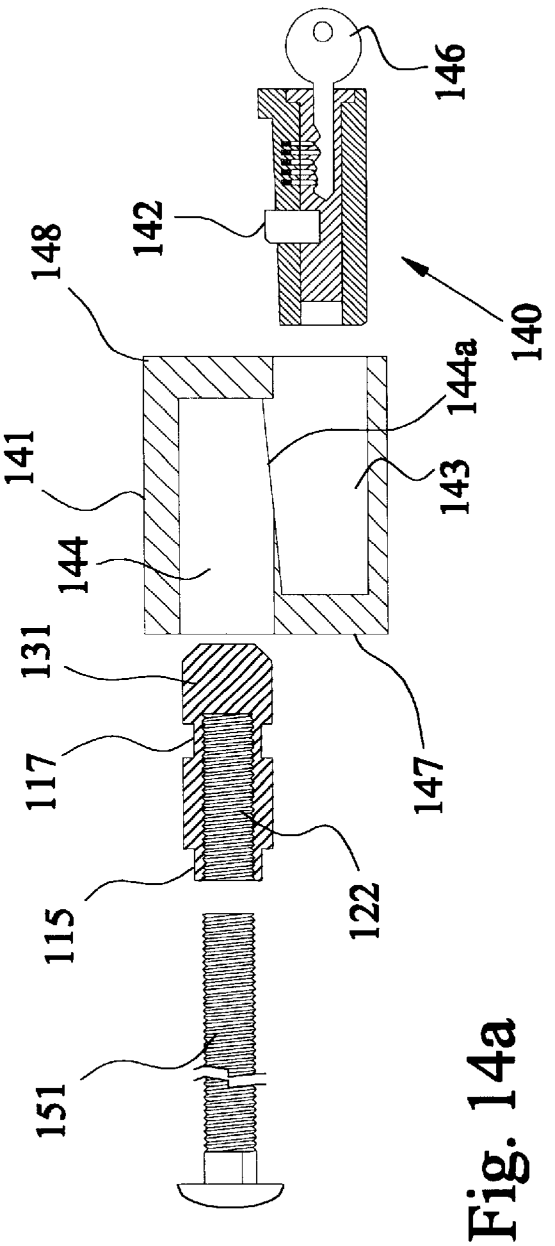
FIG. 14*a* is a side exploded view in section showing a further embodiment of the invention.
Figure 14:
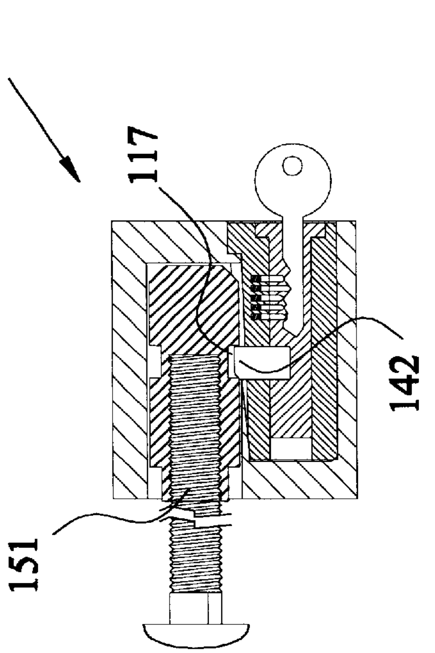
FIG. 14 is a side view in section showing a further embodiment of the invention assembled in accordance with the invention.

FIG. 14 shows how the components shown in FIG. 14*a* are assembled to form lock assembly 145. Lock catch 142, once snapped in position inside groove 117 prevents coach bolt 151 from being unscrewed. Once assembled, lock assembly 145 can spin freely around the axis of coach bolt 151 by reason of groove 117 which prevents longitudinal movement, and thus removal, of the assembly. Once assembled in position as shown, lock assembly 145 is only removable by using key 146 of lock assembly 145 to depress lock catch 142.

Figure 15:
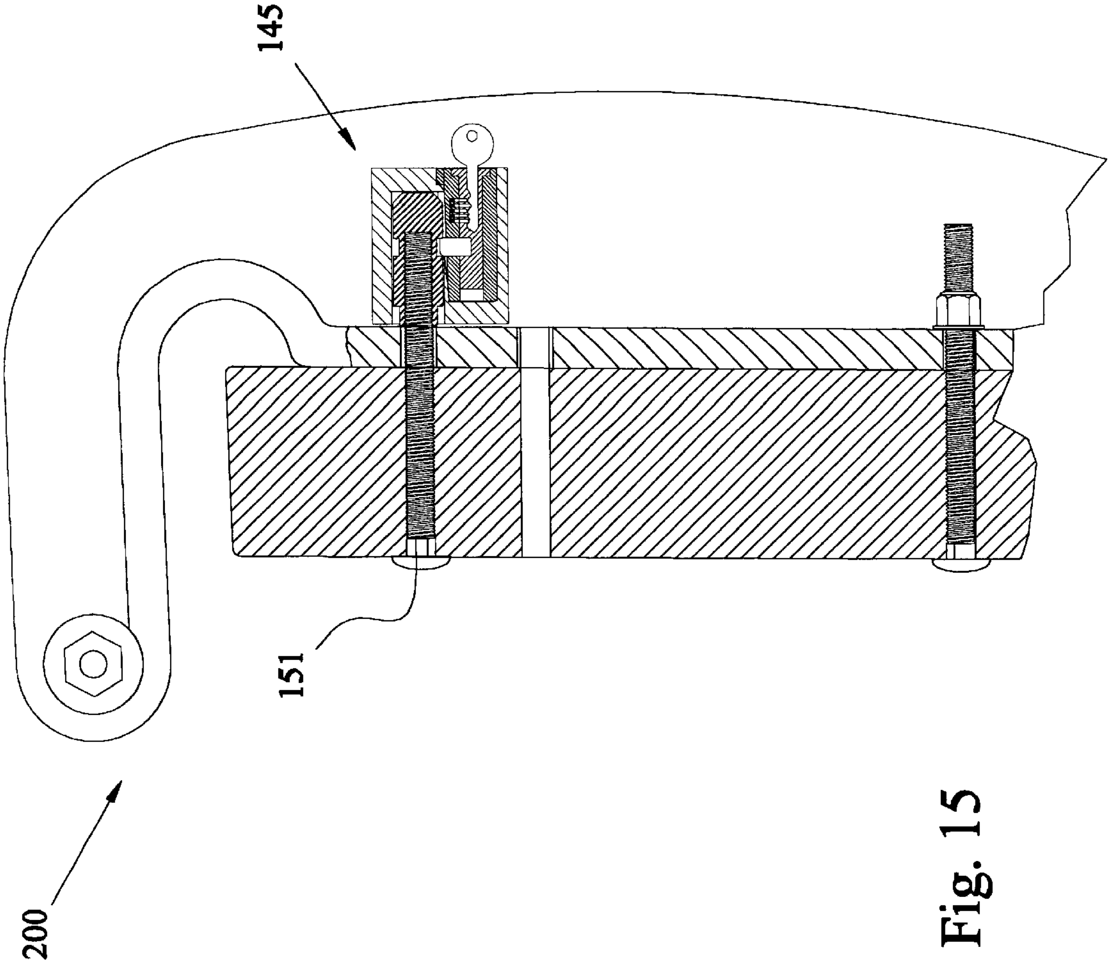
FIG. 15 is a side view in section showing a further embodiment of the invention assembled in accordance with the invention and mounted to a typical outboard mount assembly.

FIG. 15 shows a typical use of lock assembly 145 in securing outboard mounting components 200 from being separated without the lock assembly being removed.

Figure 16:
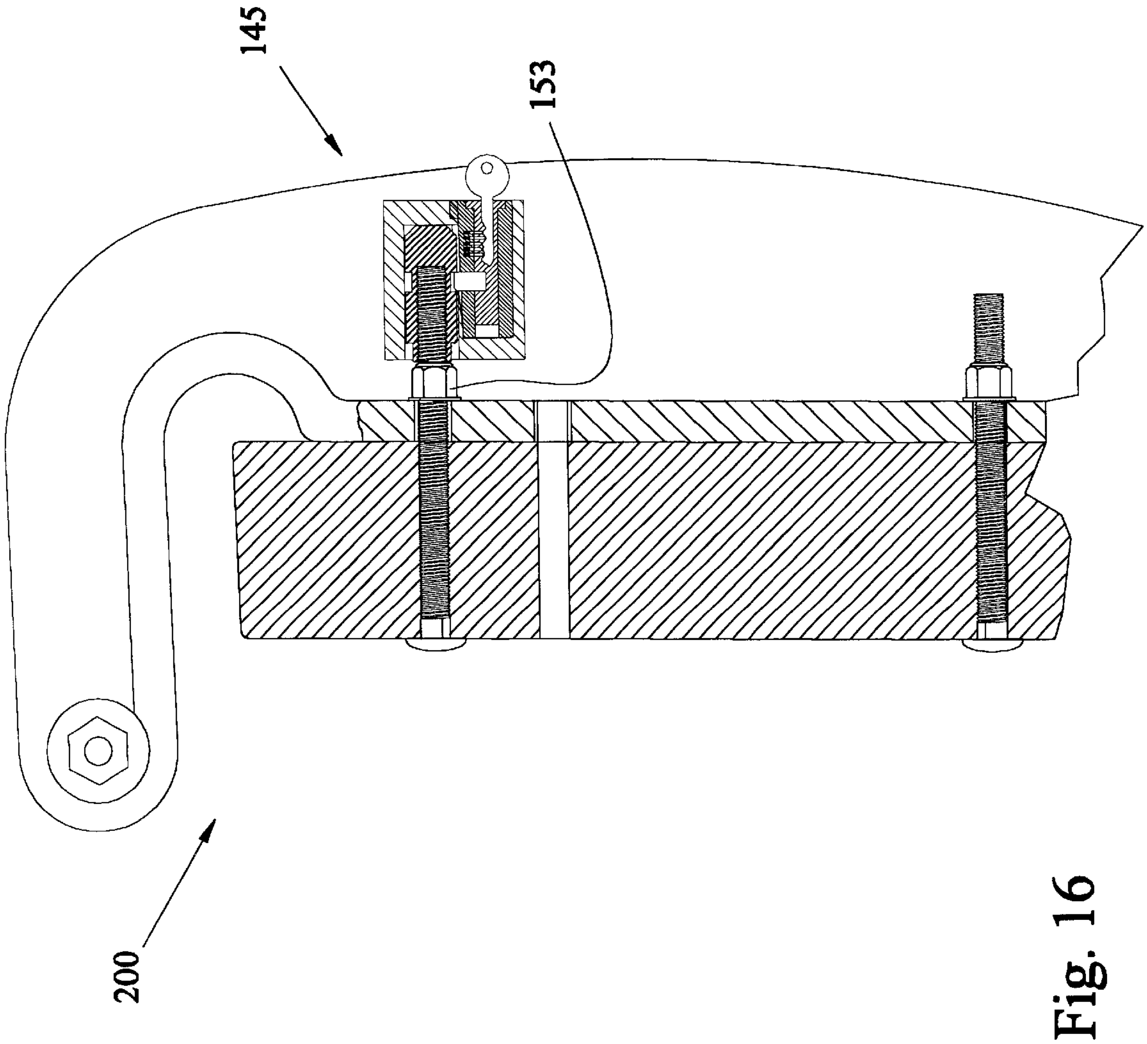
FIG. 16 is a side view in section showing a further embodiment of the invention assembled in accordance with the invention and mounted to a typical outboard mount assembly.

FIG. 16 shows a typical use of lock assembly 145 in securing outboard mounting components 200 from being separated without the lock assembly being removed. In this instance, lock assembly 145 has been fitted on top of lock nut 153 to prevent its removal.

Figure 17:
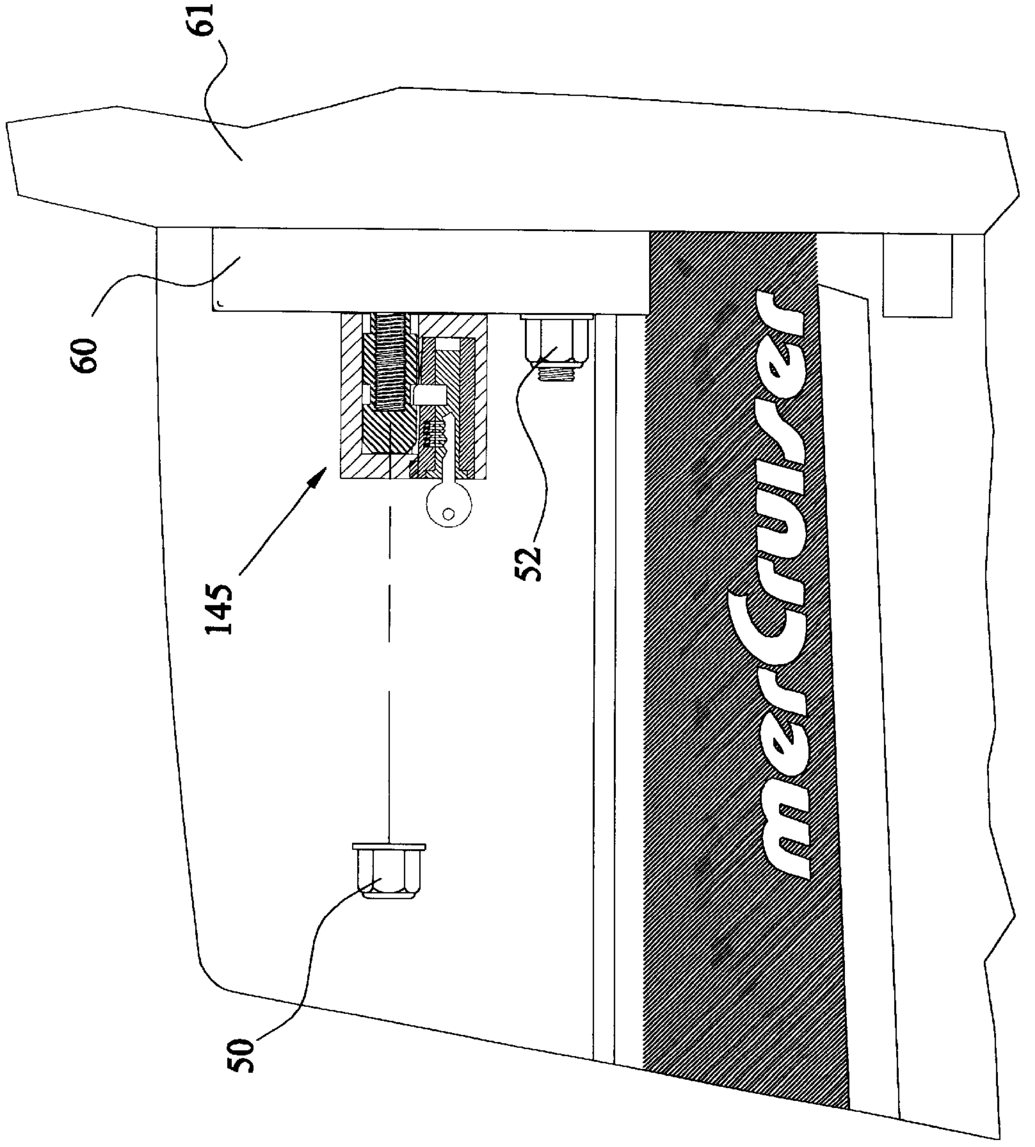
FIG. 17 is a side view in section showing a further embodiment of the invention assembled in accordance with the invention and mounted to a typical stern drive assembly.

FIG. 17 shows a typical use of lock assembly 145 preventing out drive 60 and motor body 61 from being separated without the lock assembly being removed. In this view, lock nut 50 has been replaced by lock assembly 145.

Description of a Fourth Embodiment

Figure 18:
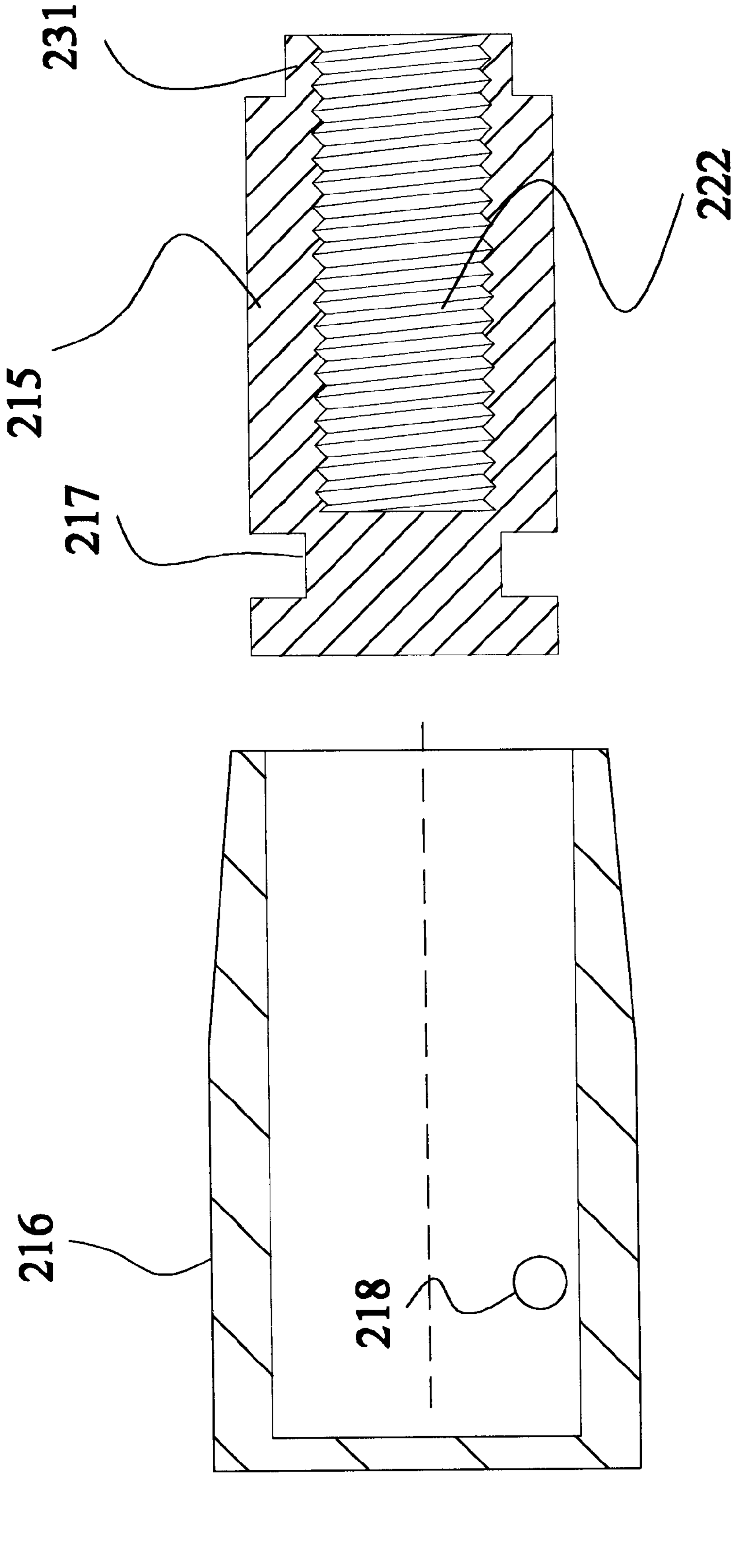
FIG. 18 is an exploded side view in section showing a further embodiment of the invention assembled in accordance with the invention.

FIG. 18 shows lock pin 215 in place to slide inside cover 216. Lock pin 215 is threaded internally with thread 222. Groove 217 is positioned so that it will align with hole 218 once cover 216 is slid into position over lock pin 215.

Figure 18B:
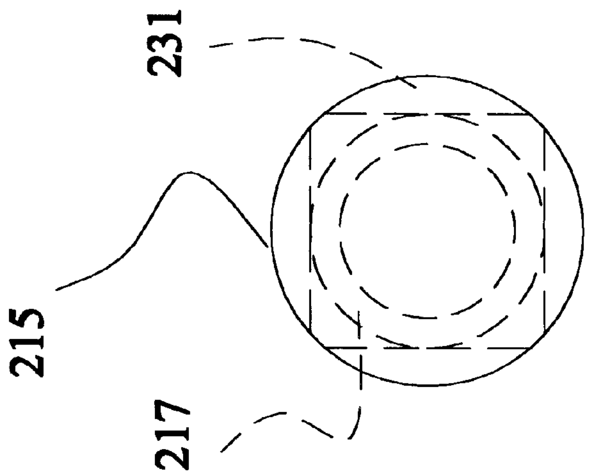
FIGS. 18*a* and 18*b* are top views of the same embodiment shown in FIG. 18.
Figure 18A:
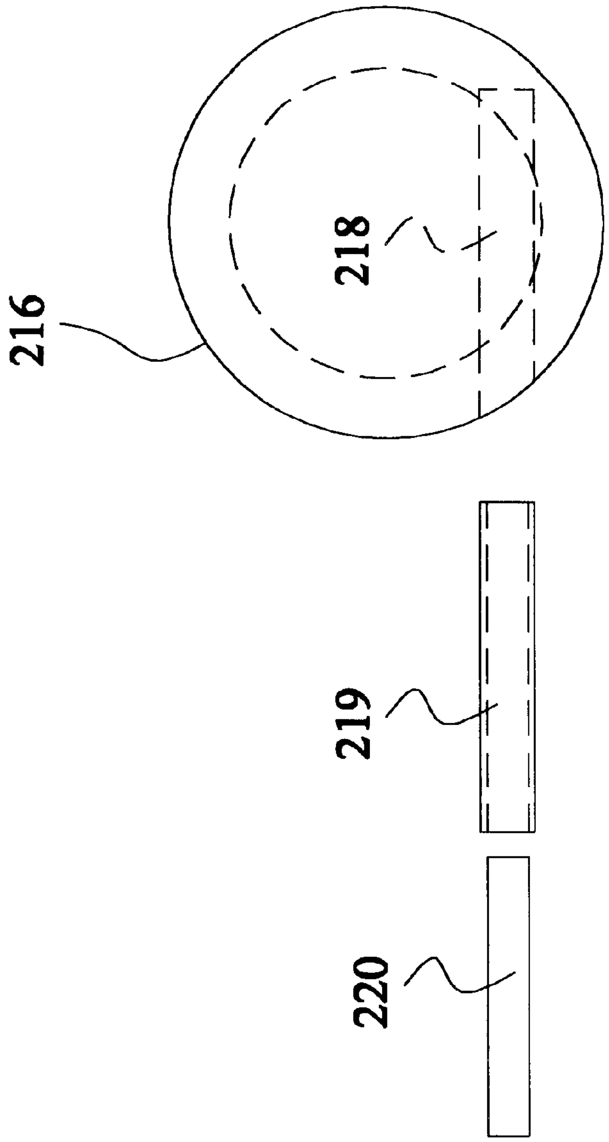

FIGS. 18*a* shows from a top view, cover 216 with hole 218 shown in broken section. Carbide core 220 is in position ready to be tapped inside roll pin 219 which in turn is in position ready to be tapped into hole 218. FIG. 18*b* shows a top view of lock pin 215 showing groove 217 and square section 231.

Figure 19:
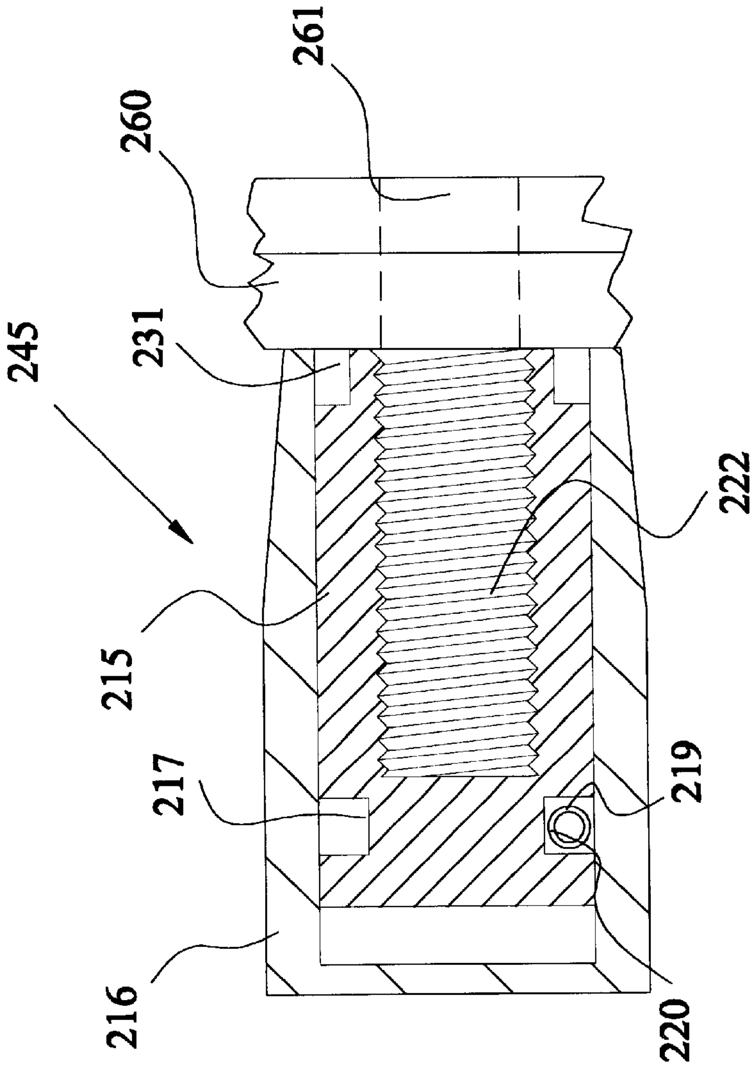
FIG. 19 is a side view in section showing a further embodiment of the invention assembled in accordance with the invention and mounted to a typical assembly wherein two plates are bolted together.

FIG. 19 shows lock assembly 245 in position to secure together plates 260 and 261. Cover 216 has been slid over lock pin 215 and carbide core 220 and roll pin 219 have been fitted. Groove 217 aligns with roll pin 219 preventing cover 216 from being removed longitudinally while allowing it to revolve around its axis. Once assembled in this fashion, lock assembly 245 prevents the removal or separation of threaded components secured by thread 222 and which abut cover 216 and lock pin 215. Cover 216 can be removed only by cutting it through with an abrasive cutting wheel to remove roll pin 219 and carbide core 220. Neither roll pin 219 or carbide core 220 can be removed by drilling and cannot be punched through as hole 218 in cover 216 is blind. Cover 216 cannot be removed by rotating it as it simply spins around its axis and lock pin 215 cannot be unscrewed because there is no access to it once cover 216 is pinned in place. Cover 216 and lock pin 215 are made with the same work hardened 304 stainless as the other embodiments of this lock system and are therefore not subject to removal using simple hand tools such as files or saw blades. 304 stainless cannot be cut with normal gas cutting equipment because it contains no carbon, neither can it be frozen and cracked.

Figure 20:
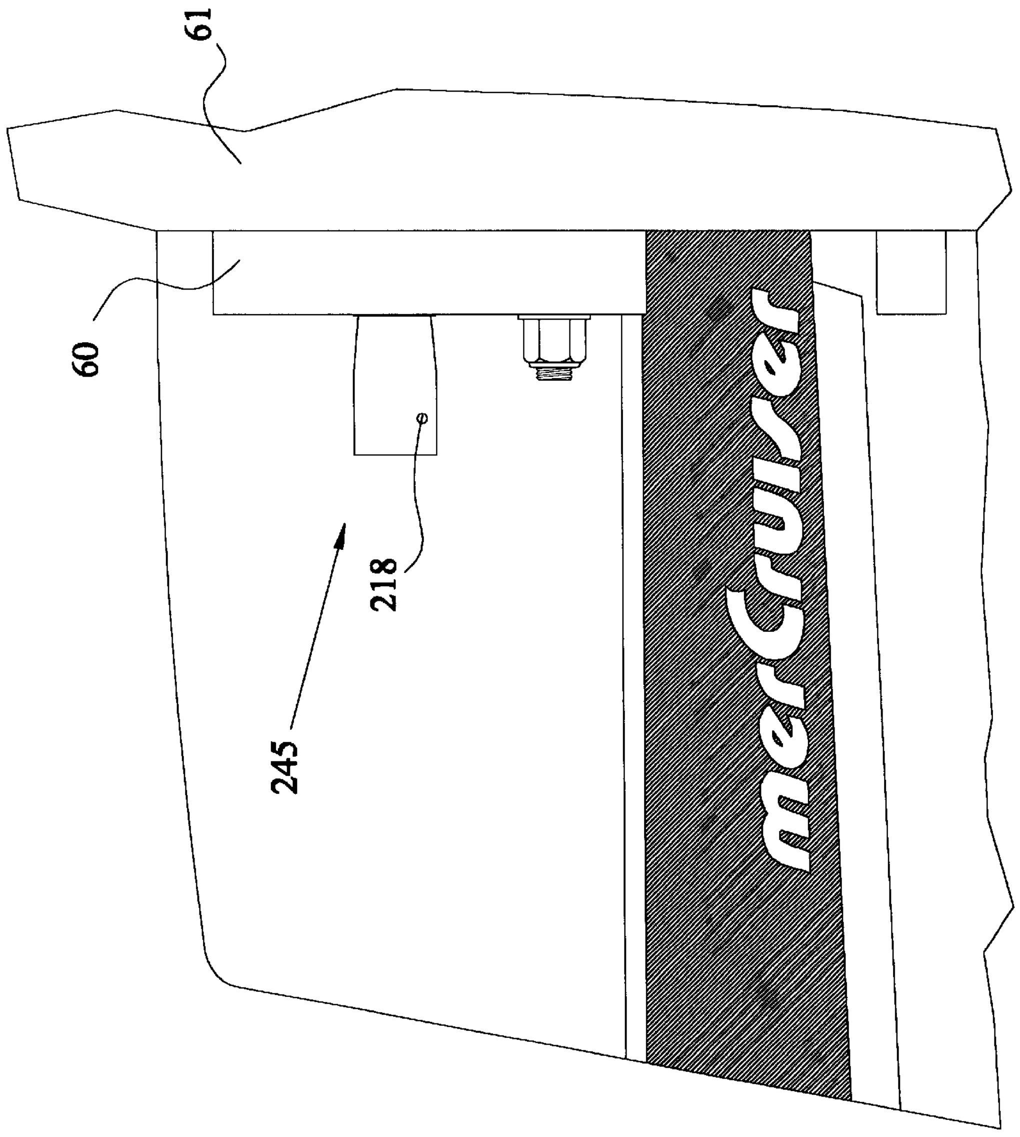
FIG. 20 is a side view showing a further embodiment of the invention assembled in accordance with the invention and mounted to a typical stern drive assembly.
Figure 21:
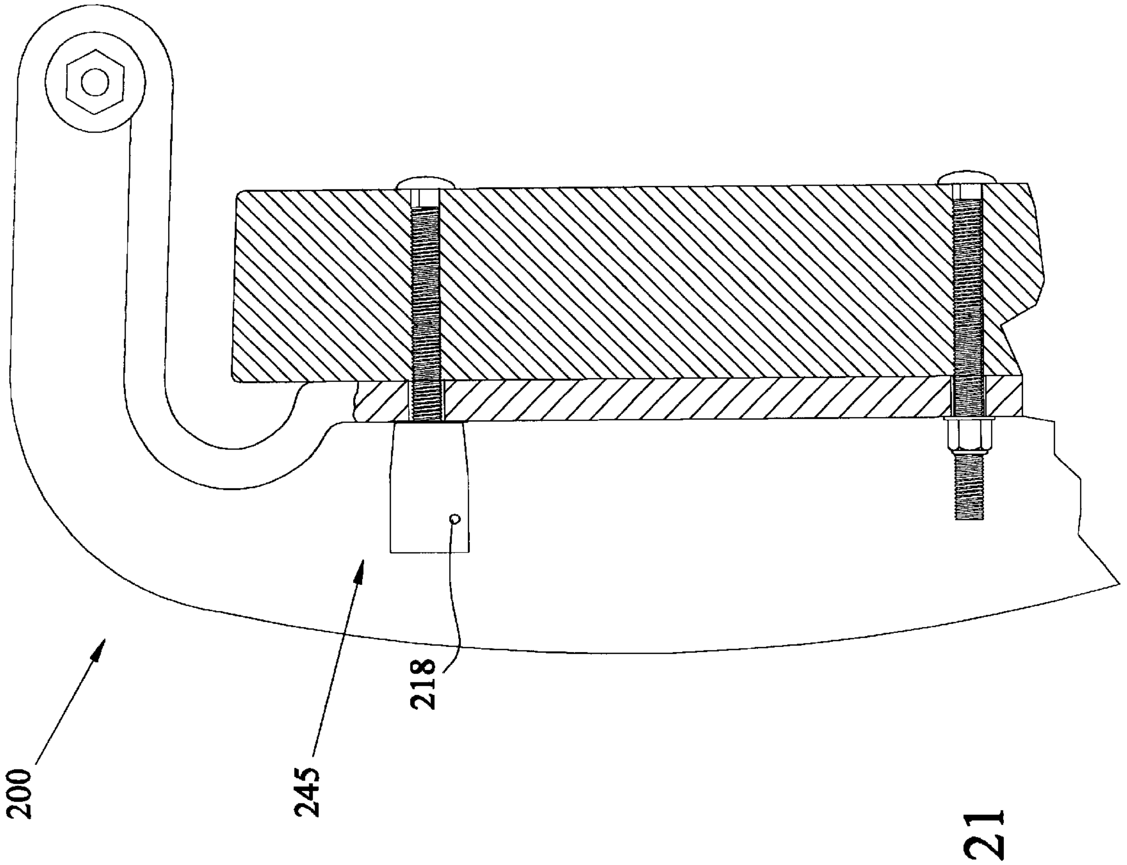
FIG. 21 is a side view showing a further embodiment of the invention assembled in accordance with the invention and mounted to a typical outboard mount assembly.

FIGS. 20 and 21 show typical uses for locking assembly 245 on a stern drive unit and outboard motor mount respectively.

What is claimed is:

1. A locking device for securing outboard motors and stern drives mounted on a plurality of exposed studs on the stern of a boat, and construction equipment on a plurality of exposed studs inset in concrete or other media, and other items which can be mounted with exposed studs upon which the locking device can be mounted, said device consisting of:

a lock pin having a first end and a second end, said lock pin having a threaded blind hole therein along a center line of said lock pin, parallel to a center line drawn through said lock pin, said first end having a plurality of flat surfaces for gripping and turning said lock pin, and a circular groove formed around the periphery of said second end of said lock pin, a locking cover having a first end and a second end, a first blind hole formed in said first end along a center line of said locking cover and a second blind hole formed in said second end, perpendicular to said first blind hole, said locking cover being assembled on said lock pin, and a roll pin having a hole formed therein being inserted in said second blind hole and a carbide core being inserted in said roll pin, said roll pin and carbide core being aligned with and locking said locking cover thereby preventing removal of said lock pin.

* * * * *